R. S. BRYANT.
DEMOUNTABLE VEHICLE WHEEL RIM.
APPLICATION FILED JULY 31, 1913.

1,117,163.  Patented Nov. 17, 1914.

Witnesses:
O. M. Kappler
H. B. Fay.

Inventor
Richard S. Bryant
By Fay & Oberlin
Attorneys

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

DEMOUNTABLE VEHICLE WHEEL-RIM.

1,117,163.  Specification of Letters Patent.  Patented Nov. 17, 1914.

Application filed July 31, 1913. Serial No. 782,308.

*To all whom it may concern:*

Be it known that I, RICHARD S. BRYANT, a citizen of the United States, and a resident of Cleveland, county of Cuyahoga, and State of Ohio, have invented a new and useful Improvement in Demountable Vehicle Wheel-Rims, of which the following is a specification, the principle of the invention being herein explained and the best mode in which I have contemplated applying that principle, so as to distinguish it from other inventions.

The present improvements relate more particularly to that type of demountable tire-supporting rim wherein provision is made for the placing on of the tire and its removal from the rim by transversely splitting the latter so as to permit of its contraction to less than normal diameter. This construction permits of the use of integral flanges for retaining the tire on the rim in place of the detachable flanges, one or more of which are otherwise necessary for use with modern double-tube pneumatic tires, the outer tube or "shoe" of which has relatively inextensible edges.

The object of the present invention is to provide a "split" rim of the type just referred to having a superior form of split or joint where its ends come together, as also to provide improved locking means for securing such ends against relative displacement.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

Figure 1:
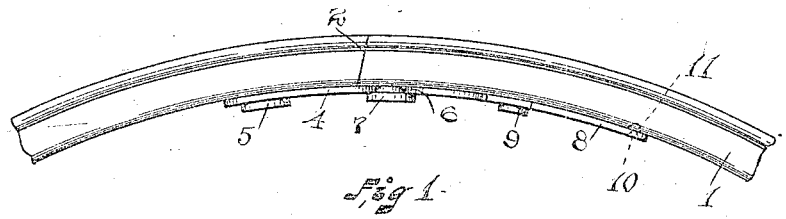
Figure 2:
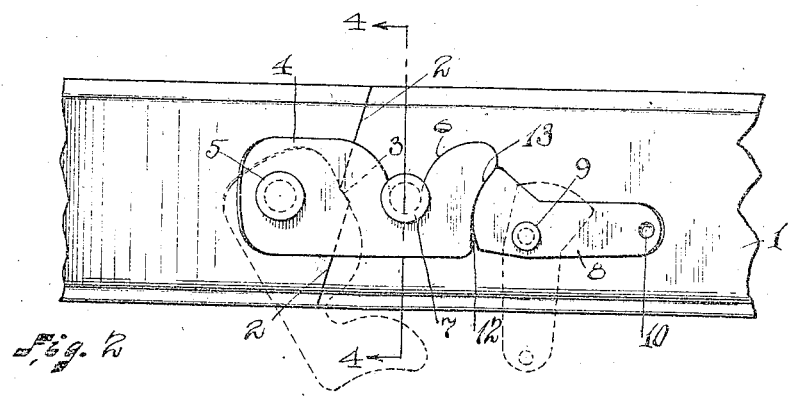
Figure 3:
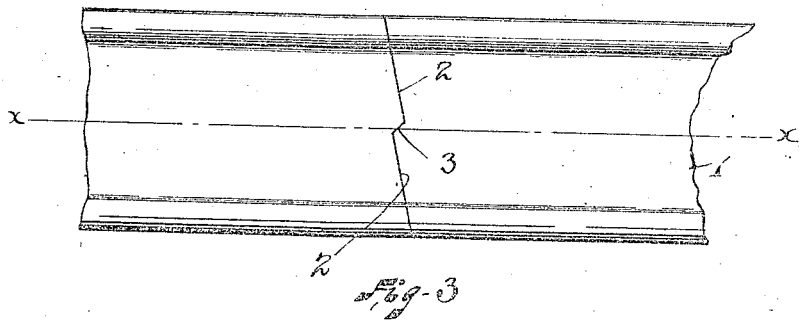
Figure 4:
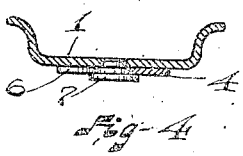
Figure 5:
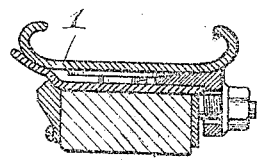

In said annexed drawing:—Figure 1 is a side elevation of a portion of a rim embodying my present improvements; Fig. 2 is a bottom plan view of such rim portion; Fig. 3 is a top plan view thereof; Fig. 4 is a section of the same taken on the plane indicated by the line 4—4, Fig. 2; and Fig. 5 illustrates one approved mode of securing such demountable rim onto the wheel felly, the rim shown in this figure being furthermore designed for receiving a clencher tire instead of a plain sided tire as in the case of the rim shown in the preceding figures.

My improved rim, as usual in rims of the type in hand, consists, in effect, of a discontinuous band or annulus 1 having its respective ends of complementary form and normally held in contact by the resilience of the band. Such band may have either the cross-section illustrated in Fig. 4 for the reception of straight sided tires, or that shown in Fig. 5 for the reception of clencher tires. The form of the abutting ends of the band or rim is such as to give the effect, when such ends are in juxtaposition, of a slit, the main portions 2 of which incline to the median line $x$—$x$ (Fig. 3) of the rim, such slit further including a short jog 3 between its ends of a different inclination. Preferably the angle of inclination of such main portions of the rim ends to the median line, as well as that of the differently inclined portions or jogs, is other than a right angle, the inclination of the jogs being opposite to that of the main portions as shown in Figs. 2 and 3. As a result of this construction the ends of the band may be brought together with a lateral movement which is limited, however, by the engagement of the reversely inclined portion or jog in the slit, as clearly shown in Fig. 3.

In order to hold the ends of the band together, a locking device is provided, preferably of the form shown in Fig. 2, such device consisting of a latch 4 pivotal about a pin 5 on one side of the slit and having a flaring notch or recess 6 adapted to engage a pin 7 on the opposite side of such recess. The latch is shown in engaging position in full lines, and in open position in dotted lines in the figure of reference. Adapted to coöperate with the forward or free swinging end of the latch when in its engaging position, is a locking member 8 proper, pivotally secured to another pin 9 and adapted to be retained in locking position by the action of a punched-up lug 10 near its free extremity which engages with a corresponding depression 11 in the inner face of the rim (Figs. 1 and 2).

The engaging face of this locking member comprises in part a curved portion 12 lying eccentric with reference to the pivotal axis formed by pin 9 and thus is adapted not merely to engage the free end of the latch 4, but will tend to force the latter home, as it were, into proper position. The remaining portion 13 of the engaging face of member 8 is substantially straight and it is in coöperation with the corresponding portion of the latch that the locking action occurs when these faces are brought into contact with each other.

The felly band 14 for receiving the aforesaid improved tire supporting rim will preferably have its one edge 15 flanged on an incline, as shown in Fig. 5, so as to form a beveled seat for one side of the rim, a plurality of wedge members 16, of which only one appears in the drawing, forming the supporting means for the other side. The space between the felly band and the rim will be just sufficient to accommodate the pins 5, 7 and 9 provided in connection with the latch 4 and the locking member 8, such pins having flat heads which substantially fill the space in question.

The foregoing construction of rim, while utilizing the advantages of a transversely split rim, nevertheless provides a construction whereby the solidity of the rim in meeting both side and radial strains is substantially unimpaired by the transverse slit. Not only is safety thus insured, but the tendency of the rim to cut or wear the tire, by reason of relative movement between the ends of the rim, is entirely overcome, the jogs formed between the two similarly inclined portions of each end being adapted to inter-engage by reason of their oppositely inclined complementary formation.

Other modes of applying the principle of my invention may be employed instead of the one explained, change being made as regards the mechanism herein explained, provided the means stated by any of the following claims or the equivalent of such stated means be employed. I therefore particularly point out and distinctly claim as my invention:—

1. As an article of manufacture, a transversely split tire-supporting rim having complementary ends each formed with two portions similarly inclined to the median line of the rim and an intermediate differently inclined portion, or jog, such jogs being adapted to inter-engage when said rim-ends are in proper alinement.

2. As an article of manufacture, a transversely split tire-supporting rim having complementary ends each formed with two portions similarly inclined, and at an angle other than a right angle, to the median line of the rim, and an intermediate oppositely inclined portion, or jog, such jogs being adapted to inter-engage when said rim-ends are in proper alinement.

3. The combination with a transversely split tire-supporting rim having complementary ends each formed with two portions similarly inclined to the median line of the rim and an intermediate differently inclined portion, or jog, such jogs being adapted to inter-engage when said rim ends are in proper alinement; of a pin near one end of such rim; and a latch pivotally attached near the other end of such rim and adapted to engage said pin to retain said rim-ends in such alinement.

4. The combination with a transversely split tire-supporting rim; of a pin near one end of said rim; a latch pivotally attached near the other end of said rim and adapted to engage said pin; and a member pivotally attached to said rim adjacent to said pin and adapted to retain said latch in its pin-engaging position.

5. The combination with a transversely split tire-supporting rim; of a pin near one end of said rim; a latch pivotally attached near the other end of said rim and adapted to engage said pin; and a member pivotally attached to said rim adjacent to said pin and having an eccentric face adapted to bear against said latch to force and retain the same in its pin-engaging position.

6. The combination with a transversely split tire-supporting rim; of a pin on the inner face of said rim near its one end; a latch pivotally attached to such inner rim-face near the other end of said rim, said latch having a notch adapted to engage said pin; a member pivotally attached to said rim adjacent to said pin and having an eccentric face adapted to bear against said latch to force and retain the same in its pin-engaging position; and means for securing said member in such latch-locking position.

7. The combination with a transversely split tire-supporting rim having its ends inclined to the median line of the rim; of a pin near one end of said rim; a latch pivotally attached near the other end of said rim and adapted to engage said pin; and a member pivotally attached to said rim adjacent to said pin and adapted to retain said latch in its pin-engaging position.

8. The combination with a transversely split tire-supporting rim having its ends each formed with two portions similarly inclined to the median line of the rim and an intermediate oppositely inclined portion, or jog, such jogs being adapted to inter-engage when said rim-ends are in proper alinement; of a pin near one end of such rim; and a latch pivotally attached near the other end of said rim and adapted to engage said pin.

9. The combination with a transversely split tire-supporting rim having its ends each formed with two portions similarly inclined to the median line of the rim and an intermediate oppositely inclined portion, or jog, such jogs being adapted to inter-engage when said rim-ends are in proper alinement; of a pin near one end of such rim; and a latch pivotally attached near the other end of said rim and adapted to engage said pin; and a member pivotally attached to said rim adjacent to said pin having an eccentric face adapted to bear against said latch to force and retain the same in its pin-engaging position.

Signed by me, this 28 day of July, 1913.

RICHARD S. BRYANT.

Attested by—
J. C. MANTERNACH,
R. C. COOLEY.